United States Patent
Dang et al.

(10) Patent No.: US 8,823,710 B2
(45) Date of Patent: Sep. 2, 2014

(54) LARGE SCALE DATA VISUALIZATION WITH INTERACTIVE CHART

(75) Inventors: Yingnong Dang, Beijing (CN); Min Wang, Beijing (CN); Xiao Yang, Beijing (CN); Dongmei Zhang, Redmond, WA (US); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1205 days.

(21) Appl. No.: 12/404,102

(22) Filed: Mar. 13, 2009

(65) Prior Publication Data

US 2010/0231595 A1     Sep. 16, 2010

(51) Int. Cl.
*G06T 11/20* (2006.01)

(52) U.S. Cl.
USPC ........................................................ 345/440

(58) Field of Classification Search
CPC ... G06T 11/206; G06T 11/322; G06T 11/323; G06T 17/30126; G06T 17/30554; G06T 17/30572; G06T 17/30716; G06T 17/30719; G06T 17/30994; G06T 19/26; G06T 19/708
USPC .............................................. 345/440, 440.1
See application file for complete search history.

(56) References Cited

U.S. PATENT DOCUMENTS

| | | | |
|---|---|---|---|
| 6,628,312 B1 | 9/2003 | Rao et al. | |
| 6,704,012 B1 * | 3/2004 | Lefave | 345/440 |
| 6,707,454 B1 | 3/2004 | Barg et al. | |
| 2002/0158887 A1 * | 10/2002 | Samra et al. | 345/619 |
| 2006/0262145 A1 | 11/2006 | Zhang et al. | |
| 2007/0203816 A1 * | 8/2007 | Costache et al. | 705/35 |
| 2007/0211056 A1 | 9/2007 | Chakraborty et al. | |
| 2008/0007555 A1 * | 1/2008 | Vrba et al. | 345/440 |
| 2008/0150937 A1 | 6/2008 | Lundstrom et al. | |

OTHER PUBLICATIONS

Buja, et al., "Interactive Data Visualization using Focusing and Linking", retrieved on Dec. 4, 2008 at <<http://ieeexplore.ieee.org/stamp/stamp.jsp?arnumber=00175794>>, IEEE, 1991, pp. 156-163.

Chen, et al., "Visualizing Multi-Dimensional Data", retrieved on Dec. 4, 2008 at <<http://research.acxiom.com/downloads/adelwp0301.pdf>> pp. 1-7.

"INTViewer", INT Viewer—Multidimensional Data Viewing and Interaction, retrieved on Dec. 4, 2008 at <<http://www.scl.com/products/int/java/enterprise/intviewer.html>>, Scientific Computers Ltd, 2008, pp. 1-2.

* cited by examiner

*Primary Examiner* — Jeffery A Brier
(74) *Attorney, Agent, or Firm* — Carole Boelitz; Micky Minhas; Lee & Hayes, pllc.

(57) ABSTRACT

This disclosure describes a user interface and techniques for an interactive graphical representation of large scale data on a display. The disclosure describes how large scale data may be viewed using multiple linked charts. In one implementation, a user interface comprises an overview chart. The user may use chart controller(s) to designate one or more portions of the overview chart viewable in subsequent charts. The user may navigate between the overview chart and the subsequent charts using the chart controller(s).

14 Claims, 8 Drawing Sheets

LARGE SCALE DATA VISUALIZATION WITH INTERACTIVE CHART

BACKGROUND

Demands for visualizing and presenting large scale data on a display continues to increase as users have become more reliant on their computer systems in their business and everyday lives. Typically, the data is presented in the form of a chart, containing large volumes of data confined to the dimensions and composition of the display.

Poor or limited screen resolution may restrict what a user may be able to see on the computer display. For example, a large scale multi-dimensional chart including a large volume of data may be difficult to view in detail on a limited resolution display, therefore making it challenging for a user to make use of the data displayed on the chart efficiently.

Therefore, there is a need for a user interface which enables a user to view large scale multi-dimensional data in a more efficient and interactive way.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In view of the above, this disclosure describes various exemplary user interfaces for large scale data visualization. The disclosure describes how large scale multi-dimensional data may be viewed using multiple linked charts with user interaction.

In one implementation, a user interface includes an overview chart. The user may use a chart controller to designate one or more portions of the overview chart viewable in subsequent charts. The user may navigate between the overview chart and the subsequent charts using the chart controller.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

This disclosure describes a user interface and techniques for an interactive graphical representation of large scale data on a display. The disclosure further describes how large scale multi-dimensional data may be viewed using multiple linked charts.

In one implementation, a user interface comprises an overview chart. The user may use a chart controller to designate one or more portions of the overview chart viewable in subsequent charts.

In another implementation, the user may navigate between the overview chart and the subsequent charts using the chart controller.

The presentation of large scale multi-dimensional data described herein is not limited to any particular application, but may be applied to many contexts and environments. The large scale multi-dimensional data may be employed in graphs, charts, large volume data presentations, and the like to be used in, for example, analyzing the stock market, analyzing and/or comparing data in research and development projects, identifying trends, applying statistics to information, and the like. In another implementation, the user interface may be employed in an environment which does not include a computing environment.

Exemplary Interactive Graphical Representation of Data

Figure 1:
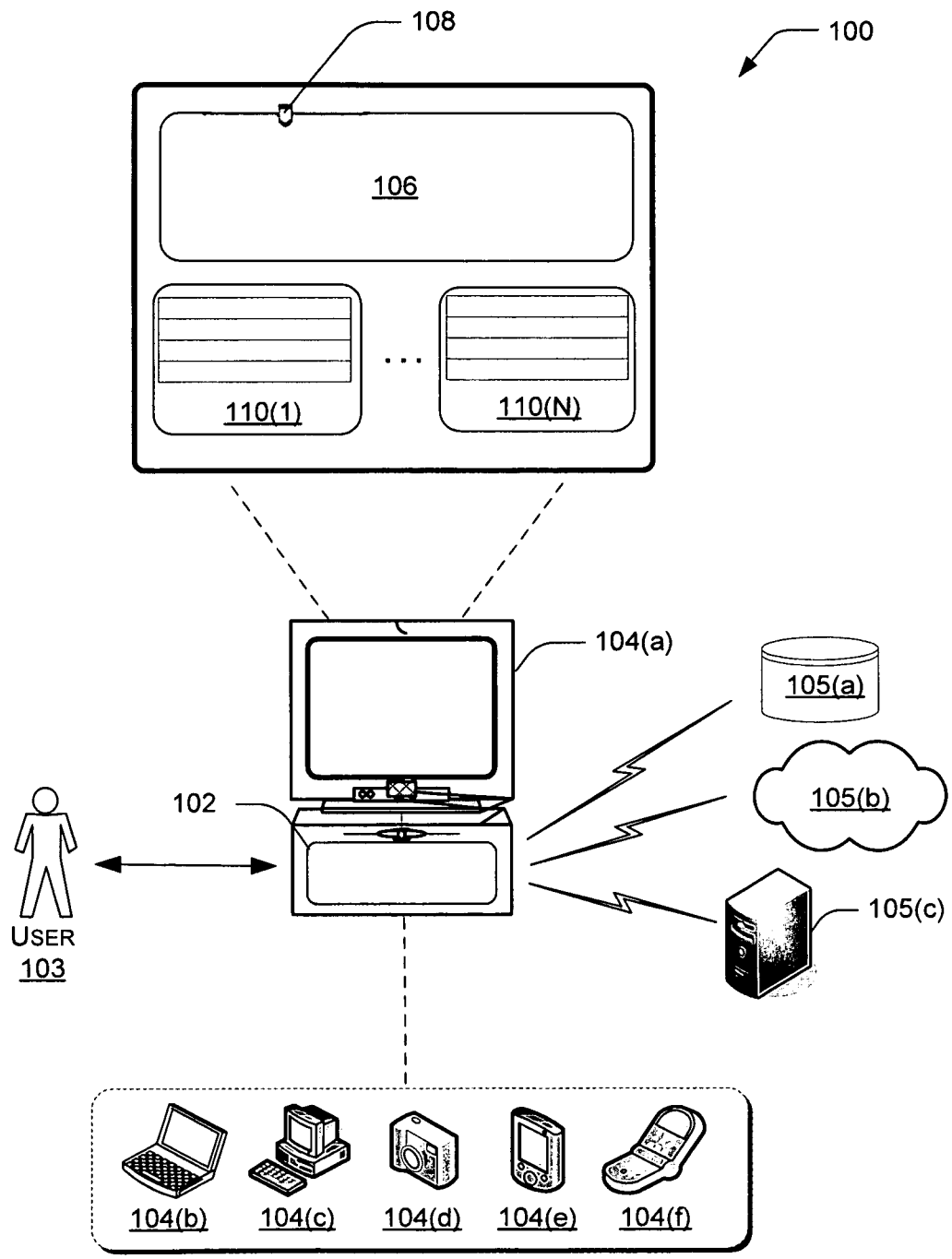
FIG. 1 illustrates a block diagram for an exemplary computing environment for an interactive user interface.

FIG. 1 illustrates a block diagram of an exemplary environment 100 for an interactive user interface 102. In accordance with one embodiment, the interactive user interface 102 presents large scale multi-dimensional data on a display to a user 103. Displays that may be used include, but are not limited to a CRT, flat LCD screen, or other types of displays. The environment 100 can be implemented, at least in part, by one or more suitable computing device(s) 104. Computing devices that may be used include, but are not limited to, a personal computer 104 (*a*), a laptop computer 104(*b*), a desktop computer 104(*c*), a digital camera 104(*d*), a personal digital assistance 104(*e*), a cellular phone 104(*f*), and other types of image sources. Graphical representation 106 is loaded onto a computing device 104 using an input device, a previously stored image contained on a storage media 105(*a*), retrieved from an online application such as the internet 105(*b*), or retrieved from a server 105(*c*).

Graphical representation 106 may be a bar chart, a column chart, a line chart, an area chart, a pie chart, a scatter chart, a vertical stack chart, a stock chart, a bubble chart, a radar chart, a graph, a map, a tag cloud, a list view, a tree structure, or the like. The user 103 may manipulate a chart controller 108 to designate one or more portions of the graphical representation 106. The chart controller 108 may be a slider, a pointer, a range controller, or the like. The user 103 may direct the chart controller 108 using, but not limited to, a mouse, a keyboard, a stylus, or the like. The designated portions of the graphical representation 106 may be viewed by the user 103 in one or more graphical representations 110(1)-110(N). It should be noted that while the interactive user interface 102 is described in the context of large scale multi-dimensional data in a computing environment, it is to be appreciated and understood that the large scale multi-dimensional can be employed in other contexts and environments, involving other types of data without departing from the spirit and scope of the claimed subject matter.

Figure 2:
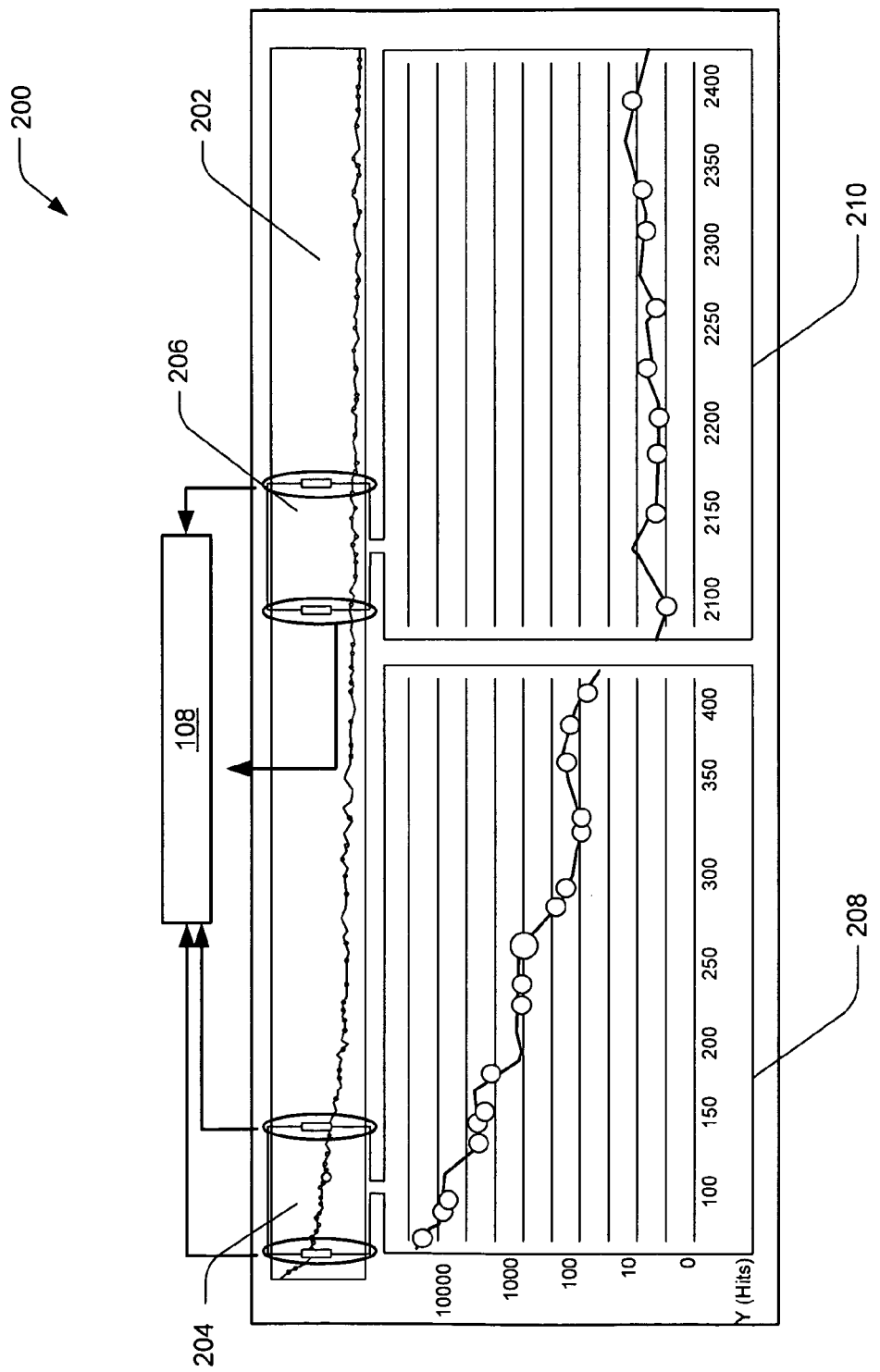
FIG. 2 illustrates a graphical representation of multiple linked charts with the interactive user interface of FIG. 1.

FIG. 2 illustrates an exemplary chart with two zoom-in charts with an interactive user interface 200. In this example, the chart controller 108 is a draggable slider that may be moved by the user 103 along an overview graph 202 to designate portions 204 and 206. The chart controller 108 may comprise one or more draggable sliders. For example, as illustrated in FIG. 2, the chart controller 108 may have one draggable slider designating portion 204 as well as a second draggable slider designating portion 206.

Portion 204 may be viewed by the user 103 in a first chart 208 and portion 206 may be viewed by the user 103 in a second chart 210. In one embodiment, the overview graph 202, the first chart 208 and the second chart 210 are viewable by the user 103 on a single display. In other implementations, the overview graph 202 may be viewed on a first display device while the first chart 208 and the second chart 210 are viewed on a second display device. The user 103 may manipulate the first chart 208 and the second chart 210. For example, the user may modify the charts to the user's desired shape and size.

The first chart 208 may be a zoom-in chart displaying a section of data of overview graph 202. The second chart 210 may be a second zoom-in chart highlighting a second section of data of the overview graph 202. The user 103 may navigate between the overview chart 202, the first chart 208, and the second chart 210, further permitting the user 103 to designate new and different portions of the overview chart 202. For example, the chart controller 108 may also be used to specify a third portion of overview graph 202. The chart controller 108 may comprise a third draggable slider used to zoom-in and view a third portion of additional details of data in the overview chart 202 viewable in a third chart. The user 103 may continue this process, using additional draggable sliders of chart controller 108, designating the desired portions of overview chart 202 viewable in subsequent zoom-in charts. Further, first chart 208 and second chart 210 may be displayed simultaneously so that the user 103 may compare data presented in first chart 208 with data presented in the second chart 210.

Figure 3:
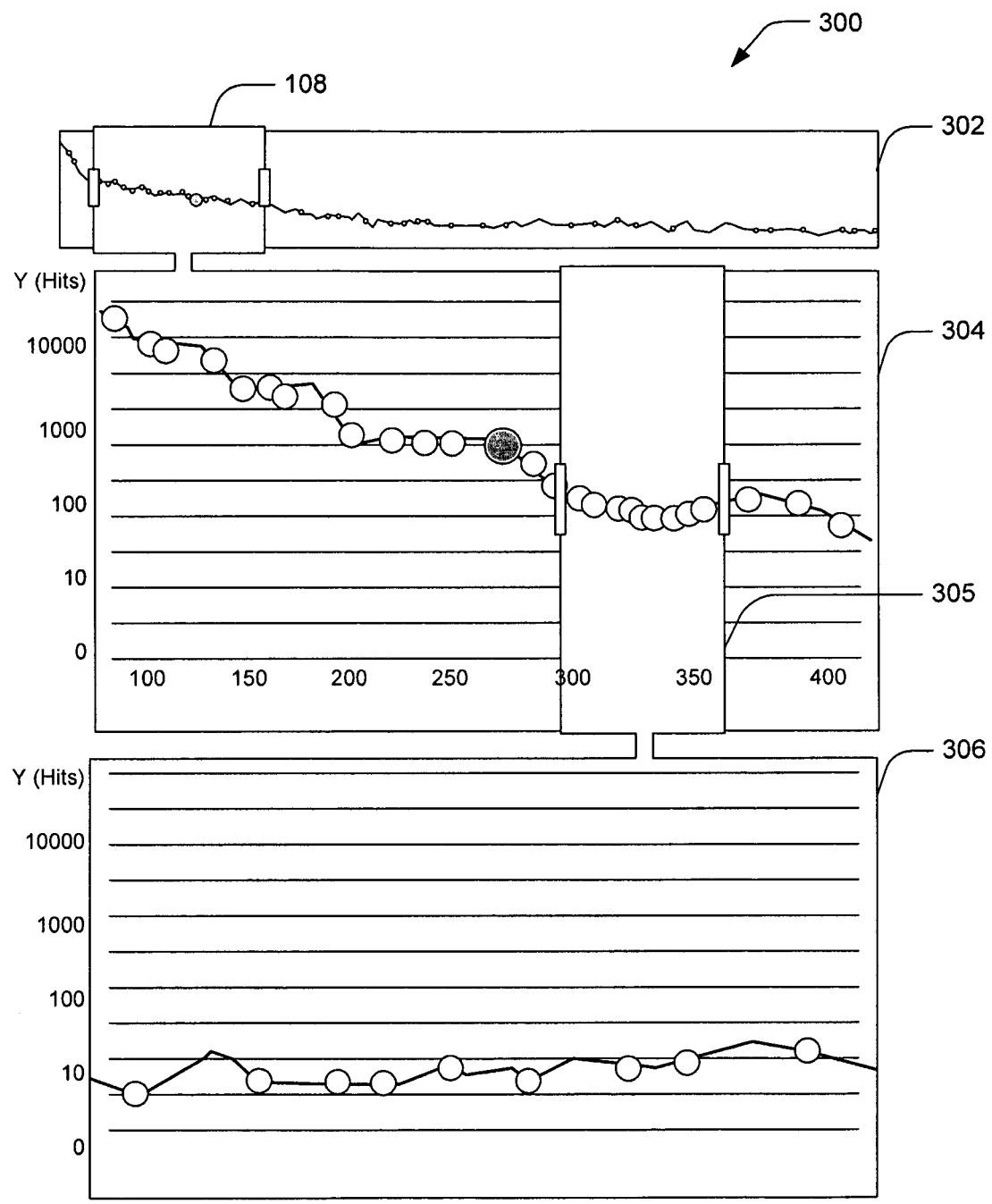
FIG. 3 illustrates a cascading graphical representation of the multiple linked charts with interactive user interface of FIG. 1.

FIG. 3 is a cascading illustration 300 of an interactive graphical representation of data linking overview chart 302, a first zoom-in chart 304, and a second zoom-in chart 306. As the user 103 selects portions of the overview chart and subsequent charts, the level of granularity increases, permitting the user 103 to continue this process until the user 103 has achieved the desirable level of detail. For example, the overview chart may comprise a graph containing all of the data the user has input. Utilizing the chart controller 108, the user 103 may select a portion of overview chart 302 viewable in a first zoom-in chart 304. Next, using a second chart controller 305, the user 103 may select a portion of zoom-in chart 304 viewable in a second zoom-in chart 306. The cascading illustrated of the interactive graphical representation is a succession of the data in subsequent zoom-in charts.

In another implementation, the user may use a second chart controller 305 to designate a portion of zoom-in chart 304. It is to be appreciated that additional zoom-in charts maybe added to view details for portions of data in overview chart 302. For example, second chart controller 305 may comprise one or more draggable sliders, designating additional zoom-in charts highlighting additional detail.

It is also to be appreciated that in each cascading or granularity level, multiple chart controllers may be used. For example, each granularity level may have a corresponding chart controller permitting the user 103 to zoom-in and view additional details. In one implementation, each granularity level may be viewed as an overview chart. Each corresponding chart controller may also have multiple draggable sliders similar to that illustrated in FIG. 2, allowing the user to designate one or more portions in a given granularity level viewable in a subsequent chart. The user 103 may then display each cascading level concurrently, allowing the user to compare the information presented at the various levels. However, the user may also display each level separately.

In another implementation, the user 103 may view multiple dimensional information associated with the first designated portion of overview chart 302. For example, a first chart 304 may contain information pertaining to dates for a first designated portion, while second chart 306 contains information pertaining to the number of emails received during the same first designated portion.

It is to be appreciated that the user 103 may use a combination of multiple chart controllers, multiple zoom-in charts, multiple dimensional information and the like, dependent upon the user's needs and the project.

Interactive Graphical Representation Containing Metadata

Figure 4:
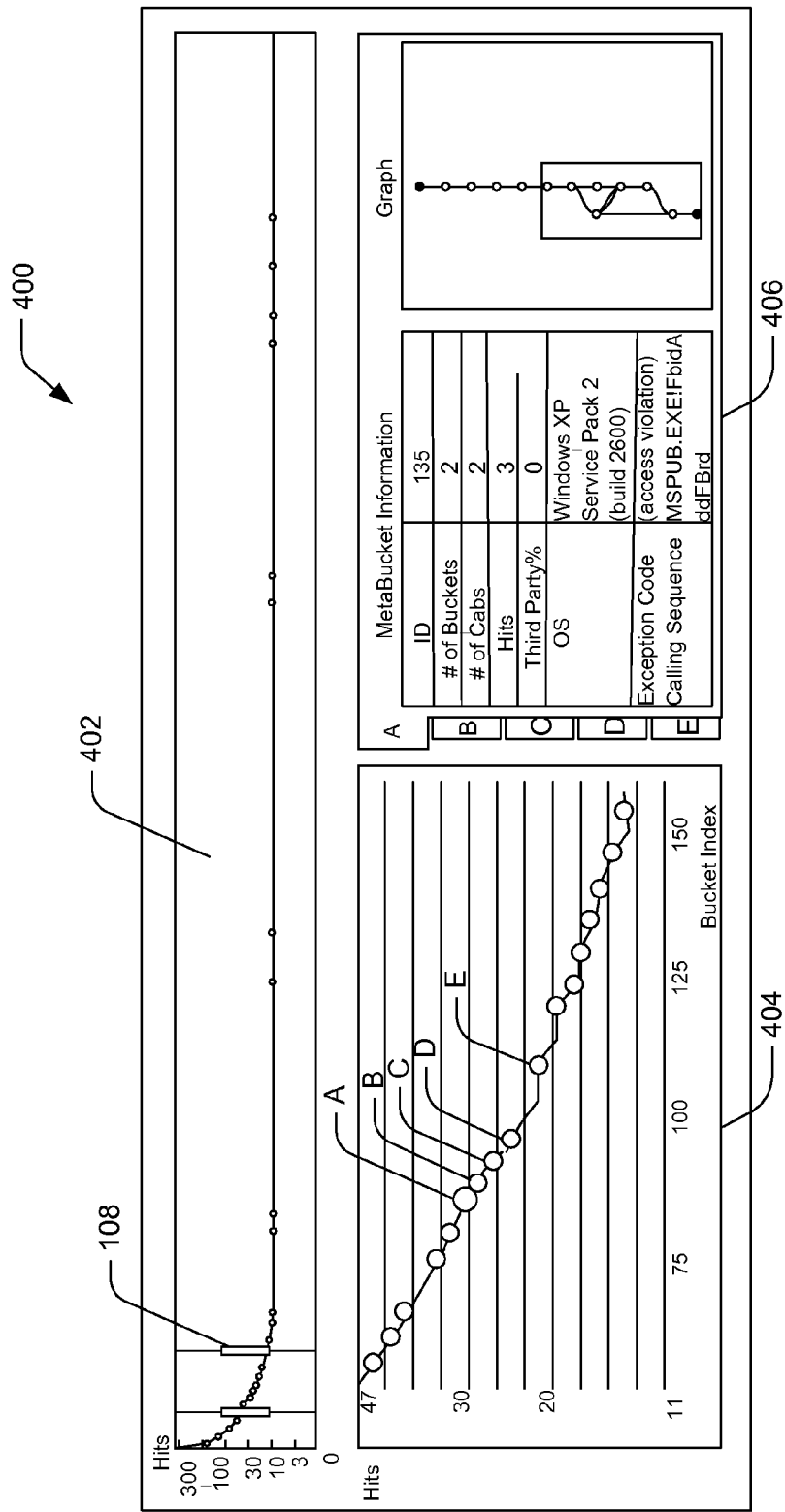
FIG. 4 illustrates the graphical representation of the multiple linked charts including metadata with interactive user interface of FIG. 1.

FIG. 4 illustrates an exemplary interactive user interface presenting both charts as well as metadata associated to the data to the charts 400. Overview graph 402 contains data points ranging from 0 to 1000 on the y-axis and 0 to 2500 on the x-axis. However, in other implementations the graph may contain data points lying in any desired range. The user 103, utilizing chart controller 108, may choose any desired region within overview chart 402 to zoom-in on, receiving more detailed information relating to that region. As shown in graph 404, the user 103 has chosen a section ranging between 11 and 47 on the y-axis and 11 and 150 on the x-axis.

In one implementation, upon choosing the desired region, about five data points within that region are automatically labeled A-E. In other implementations, any number of data points within the desired region may be automatically labeled. In another implementation, the user 103 may choose the desired region, as shown in graph 404, followed by choosing data points along the graph which the user would like to label. It is to be appreciated that while a set of data points remain unlabeled, the user 103 may choose an unlabeled data point in graph 404 and that data point will receive a label. For example, in one implementation, if the user 103 chooses an unlabeled data point, the unlabeled data point will replace data point A along the graph. In other implementations, the unlabeled data point will receive a sequential label to those already labeled along graph 404.

As shown in window 406, the user 103 may also view metadata associated with each labeled data point. In one implementation, the metadata in window 406 is automatically generated or retrieved and presented when the data points A-E are labeled. The user 103 may then choose a tab in window 406 to view additional information associated with the specific labeled data point. For example, data point A corresponds to several numerical and textual type metadata as shown in left part of chart 406 and a graphical type metadata as shown in right part of chart 406. However, it is to be appreciated that window 406 may contain any metadata associated with the corresponding data point. If the user 103 wishes to view metadata associated with data point C, they would then click on C in graph 404 to generate information similar to that displayed in window 406. In other implementations, the user may choose the C tab in window 406 to view metadata associated with data point C.

In another implementation, the metadata contained in window 406 may be generated or retrieved when the user 103 chooses a data point in graph 404. For example, the user 103 may choose data point A. Upon choosing data point A, the metadata contained in window 406 will be generated or retrieved. The user 103 may then choose a second data point, data point B for example, and the corresponding metadata will be generated or retrieved. In one implementation, when the metadata associated with data point B is generated or retrieved, the metadata associated with data point A will no longer be viewable in window 406. In other implementations, the metadata associated with data point A, will remain in window 406 along with the metadata associated with data point B.

Figure 5:
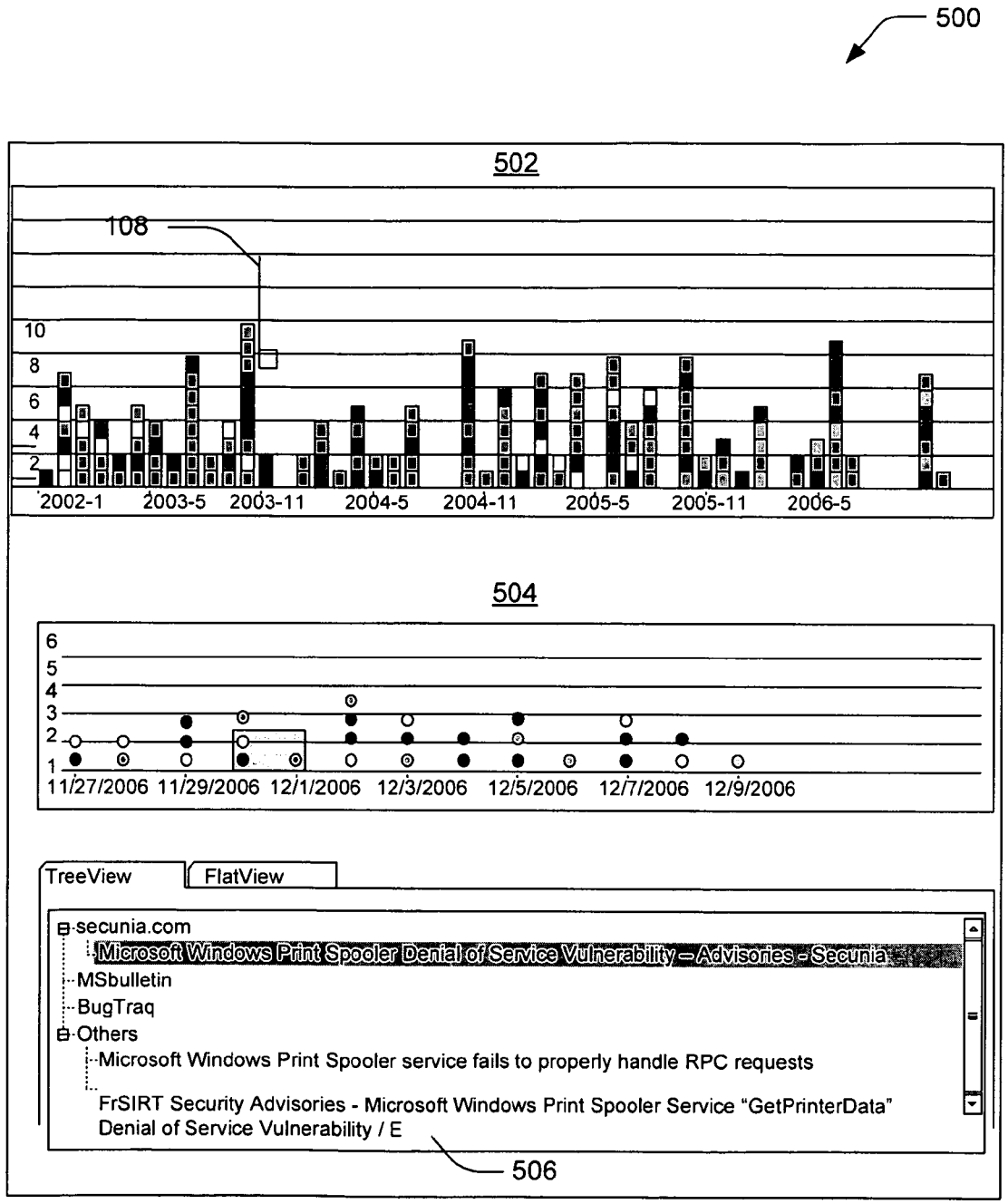
FIG. 5 illustrates the cascading graphical representation of the multiple linked charts with interactive user interface of FIG. 1.

FIG. 5 is an illustration of an interactive graphical representation of data 500 including cascading levels detailing information contained within overview chart 502.

Cascading graphical representation 500 includes an overview chart 502, a first chart 504, and a second chart 506. As an example, the overview chart 502 exhibits a vulnerability history of a software product ranging from the year 2002 to the year 2006. One block represents one vulnerability; the color depth of the block represents its severity. In this example, the chart controller 108 selects specific block from within the bar chart. Shown in FIG. 5, the chart controller 108 selects a block from the column labeled 2003-11. The first chart 504 is generated in response to the selection from the overview chart 502. In one implementation, the overview chart 502, the first chart 504, and the second chart 506 are linked and the user 103 may navigate between the linked charts using the chart controller 108. In one implementation, the first chart 504 contains a profile of vulnerability from the selected region. In this example, the first chart 504 displays a temporal trend of related messages. The related messages range contains information from the following dates: Nov. 27, 2006; Nov. 29, 2006; Dec. 1, 2006, Dec. 3, 2006, Dec. 5, 2006; and Dec. 9, 2006.

In one implementation, the user 103 may select a profile from the first chart 504 to view a list of selected messages from the selected date. In this example, selection of the date using chart controller 108 generates second chart 506. In one implementation, overview chart 502, first chart 504, and second chart 506 may be viewed in a cascading fashion, in a single display. In other implementations, overview chart 502, first chart 504, and second chart 506 may be viewed separately. It is also to be appreciated that the first chart 504 may display a zoom-in portion of overview chart 502, while the second chart 506 may display additional information pertaining to the same portion displayed in the first chart, providing the user 103 one or more dimensions of information associated with the one designated portion of overview chart 502.

Figure 6:
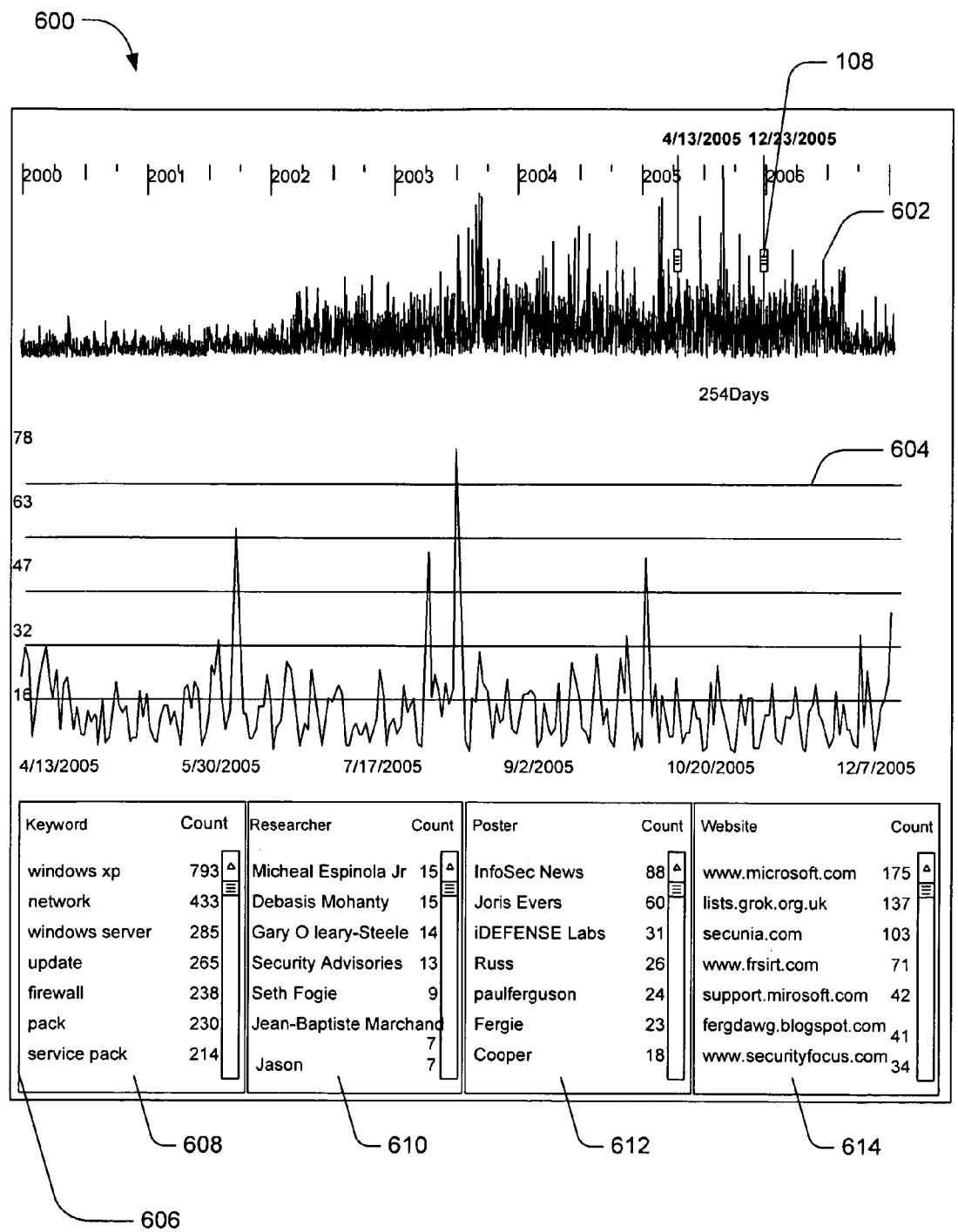
FIG. 6 illustrates the cascading graphical representation of a portion of software security data aggregated with interactive user interface of FIG. 1.

FIG. 6 is an illustration of a cascading graphical representation 600 of a portion of software security data. Graphical representation 600 includes overview chart 602, a first chart 604, and a second chart 606. As an example, overview chart 602 shows an overall trend of message count data talking about security issues pertaining to a software product. The message count data ranges from the year 2000 to the year 2006. Shown in FIG. 6, the chart controller 108 selects a specific time period within the time period described in overview chart 602. In the example shown, the selected time period is from Apr. 13, 2005 to Dec. 23, 2005. The first chart 604 is generated in response to the range selection described above. The first chart 604 shows a detailed message count for the range selected from overview chart 602.

In one implementation, in addition to the first chart 604, a second chart containing four columns of additional information associated to the range selection described above is generated, permitting the user 103 to view one or more dimensions of information associated with the range selected. However, it is to be appreciated that any number of columns may be generated.

For example, column data 608 describes the top keywords that are associated with the software security messages for the selected range. Column data 608 includes a count of how many times the key word occurs in the specified range.

Column data 610 shows the top researchers associated with the messages for the specified range. In addition to the name entries in the column data 610, a count is provided adjacent to the researcher name that describes the number of times the name of each researcher occurs in the specified range. The count could also be the number of messages posted from each researcher within the specified range.

Column data 612 shows the top message posters associated with the messages for the specified range. In addition to the name entries in the column data 612, a count is provided adjacent to the poster's name that describes the number of times the name of each poster occurs in the specified range. The count could also be the number of messages posted from each poster within the specified range.

Column data 614 shows the top websites associated with the messages for the specified range. In addition to the site name entries in the column data 614, a count is provided adjacent to the site name that describes the number of times the name of each site occurs in the specified range. The count could also be the number of messages accessed from each site.

Exemplary Method of Interactive Graphical Representation of Data

Figure 7:
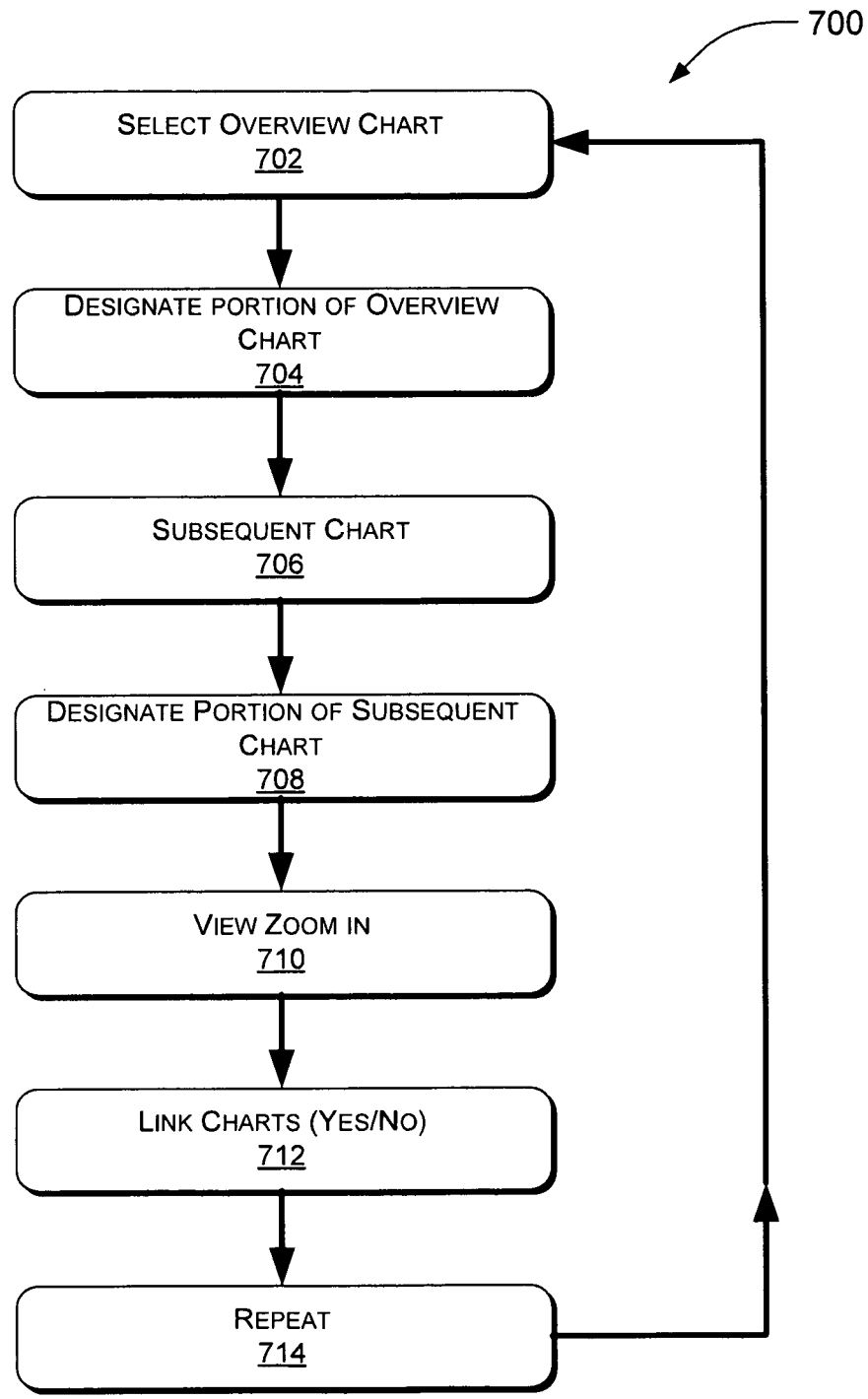
FIG. 7 illustrates a process flow for an exemplary interactive graphical representation method.

FIG. 7 illustrates an exemplary method 700 for interactive graphical representation of data. The process 700 begins by selecting an overview graph as represented by block 702. For example, the overview chart may be a graph of multiple data points. The user 103 may select a portion of the graph in block 704 using a chart controller such as a slider, a stylus, a keyboard, or the like. After designating a portion of the graph, a subsequent graph may be displayed in block 706 detailing the highlighted portion. In block 708, the user 103 may select a portion of the subsequent graph further highlighting details of the overview graph. For example, the user 103 may zoom in, as represented by block 710. The user may link the overview graph with the one or more of the subsequent graphs using the chart controller in block 712. Linking the charts allows the user 103 to readily navigate between the various charts, further allowing the user 103 to use the information presented more efficiently. The user 103 may repeat this process until the user 103 has achieved the desirable level of detail, as represented by block 714. The level of detail may depend upon, for example, the type and scale of data the user 103 is working with and the purpose for which the user is using the interactive user interface. For example, the user 103 may desire to analyze and/or compare the finite details of the data presented in the overview chart and the one or more subsequent charts, therefore requiring several subsequent charts.

Computing Environment

Figure 8:
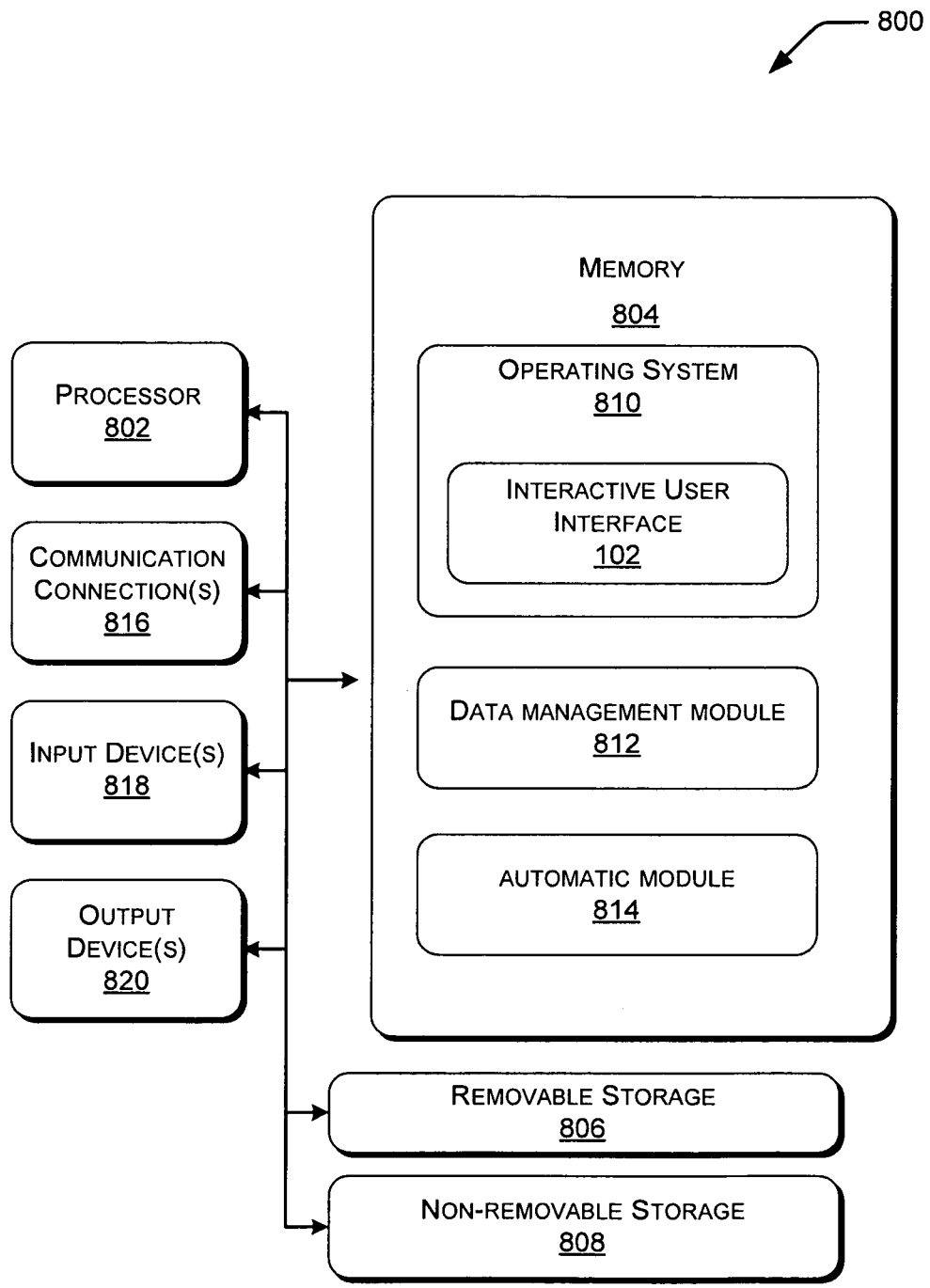
FIG. 8 illustrates a block diagram for an exemplary computing environment according to the interactive user interface.

FIG. 8 is a schematic block diagram of an exemplary general operating system 800. The system 800 may be configured as any suitable system capable of implementing interactive user interface 102. In one exemplary configuration, the system comprises at least one processor 802 and a memory 804. The processing unit 802 may be implemented as appropriate in hardware, software, firmware, or combinations thereof. Software or firmware implementations of the processing unit 802 may include computer- or machine-executable instructions written in any suitable programming language to perform the various functions described.

Memory 804 may store programs of instructions that are loadable and executable on the processor 802, as well as data generated during the execution of these programs. Depending on the configuration and type of computing device, memory 804 may be volatile (such as RAM) and/or non-volatile (such as ROM, flash memory, etc.). The system may also include additional removable storage 806 and/or non-removable storage 808 including, but not limited to, magnetic storage, optical disks, and/or tape storage. The disk drives and their associated computer-readable medium may provide non-volatile storage of computer readable instructions, data structures, program modules, and other data for the communication devices.

Memory 804, removable storage 806, and non-removable storage 808 are all examples of the computer storage medium. Additional types of computer storage medium that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 104.

Turning to the contents of the memory 804 in more detail, may include an operating system 810 and interactive user interface 102. For example, the system 800 illustrates architecture of these components residing on one system or one server. Alternatively, these components may reside in multiple other locations, servers, or systems. For instance, all of the components may exist on a client side. Furthermore, two or more of the illustrated components may combine to form a single component at a single location.

In one implementation, the memory 804 includes the interactive user interface 102, a data management module 812, and an automatic module 814. The data management module 812 stores and manages storage of information, such as images, ROI, equations, and the like, and may communicate with one or more local and/or remote databases or services. The automatic module 814 allows the process to operate without human intervention.

The system 800 may also contain communications connection(s) 816 that allow processor 802 to communicate with servers, the user terminals, and/or other devices on a network. Communications connection(s) 816 is an example of communication medium. Communication medium typically embodies computer readable instructions, data structures, and program modules. By way of example, and not limitation, communication medium includes wired media such as a wired network or direct-wired connection, and wireless media such as acoustic, RF, infrared and other wireless media. The term computer readable medium as used herein includes both storage medium and communication medium.

The system 800 may also include input device(s) 818 such as a keyboard, mouse, pen, voice input device, touch input device, etc., and output device(s) 820, such as a display, speakers, printer, etc. The system 800 may include a database hosted on the processor 802. All these devices are well known in the art and need not be discussed at length here.

CONCLUSION

Although embodiments for an interactive user interface processing data on a computing system have been described in language specific to structural features and/or methods, it is to be understood that the subject of the appended claims are not necessarily limited to the specific features or methods described. Rather, the specific features and methods are disclosed as exemplary implementations.

What is claimed is:

1. A system comprising:
one or more processors;
one or more computer-readable media maintaining instructions that, when executed by the one or more processors, cause the one or more processors to generate a user interface comprising:
a first chart presenting overall overview data at a first granularity level;
a first chart controller displayed in conjunction with the first chart, the first chart controller configured to:
designate a portion of the first chart to be presented at a second granularity level that represents an increased granularity with respect to the first granularity level; and
present a zoomed-in chart of the designated portion of the first chart, the zoomed-in chart presented separately over the first chart, wherein the zoomed-in chart comprises a zoom overview chart;
a second chart controller displayed in conjunction with the zoom overview chart, the second chart controller configured to:
designate a portion of the zoom overview chart to be presented at a third granularity level that represents an increased granularity with respect to the second granularity level; and
present one or more charts corresponding to the designated portion of the zoom overview chart, wherein the one or more charts comprise multiple dimensional information associated with the designated portion of the zoom overview chart.

2. A system comprising:
one or more processors;
one or more computer-readable media maintaining instructions that, when executed by the one or more processors, cause the one or more processors to generate a user interface comprising:
a first chart presenting an overview of data, wherein the overview of data is presented at a first granularity level;
a chart controller comprising multiple selection devices used to designate multiple portions of the first chart, wherein a first selection device designates a first zoom-in portion of the first chart viewable in a second chart at a second granularity level that represents an increased granularity with respect to the first granularity level, and a second selection device designates a second zoom-in portion of the first chart viewable in a third chart at a third granularity level that represents an increased granularity level with respect to the second granularity level; and
a display to view the first chart, the second chart, and the third chart at the same time.

3. The system of claim 2, wherein the first chart, the second chart, and the third chart are linked to allow a user to navigate between the first chart, the second chart and the third chart.

4. The system of claim 2, wherein the first chart, the second chart or the third chart comprises at least one of:
a bar chart;
a column chart;
a line chart;
an area chart;
a pie chart,
a scatter chart;
a vertical stack chart;
a stock chart;
a bubble chart;
a radar chart;

a graph;
a map;
a tag cloud;
a list view; or
a tree structure.

5. A method comprising:
under control of one or more processors,
presenting an interactive user interface with multiple chart controllers, wherein the multiple chart controllers comprise multiple selection devices that are used to designate multiple portions of a first chart presented at a first granularity level, the multiple portions of the first chart presented in multiple subsequent charts at increasing levels of granularity with respect to the first granularity level; and
using the multiple chart controllers to move between the first chart and the multiple subsequent charts.

6. The method of claim 5, wherein at least one of the multiple subsequent charts comprises one or more zoom-in charts highlighting one or more portions of the first chart.

7. The method of claim 6, further comprising:
designating a first portion of the first chart, wherein the first portion comprises multiple data points; and
presenting a second chart comprising metadata associated with the multiple data points.

8. The method of claim 7, wherein the multiple data points are automatically generated or retrieved when the first portion of the first chart is designated.

9. The method of claim 7, wherein the metadata associated with the multiple data points is generated upon selection of the first portion.

10. The method of claim 7, wherein the metadata associated with the multiple data points is generated upon selection of one of the multiple data points.

11. The method of claim 5, further comprising:
selecting a first portion of the first chart, wherein the first portion is a data point on a bar graph; and
presenting a second chart, wherein the second chart comprises metadata associated with the data point on the bar graph.

12. One or more tangible computer-readable storage media devices storing computer-executable instructions that, when executed by a computing device, perform acts comprising:
presenting a first interactive graphical representation of data at a first granularity level;
presenting a first chart controller to designate a portion of the first interactive graphical representation of data to be presented at a second granularity level that represents an increased granularity with respect to the first granularity level;
presenting the designated portion of the first interactive graphical representation of data in a second interactive graphical representation of data;
presenting a second chart controller to designate a portion of the second interactive graphical representation of data to be presented at a third granularity level that represents an increased granularity level with respect to the second granularity level;
presenting the designated portion of the second interactive graphical representation of data in a third interactive graphical representation of data; and
enabling navigation between the first interactive graphical representation of data, the second interactive graphical representation of data, and the third interactive graphical representation of data.

13. The one or more tangible computer-readable storage devices of claim 12, wherein the first interactive graphical representation of data, the second interactive graphical representation of data, and the third interactive representation of graphical data are presented in a cascading flow.

14. The one or more tangible computer-readable storage devices of claim 12, wherein the chart controller to designate a portion of the first interactive graphical representation of data comprises at least one of a slider, a pointer, or a range controller.

* * * * *